(12) United States Patent
Belenger et al.

(10) Patent No.: US 6,880,109 B2
(45) Date of Patent: Apr. 12, 2005

(54) FUNCTIONAL ELEMENT TEST TOOL AND METHOD

(75) Inventors: Kim E. Belenger, N. Dighton, MA (US); John L. Lehet, Waterford, CT (US)

(73) Assignee: The United States of America as represented by the Secretary of the State, Washington, DC (US)

( * ) Notice: Subject to any disclaimer, the term of this patent is extended or adjusted under 35 U.S.C. 154(b) by 583 days.

(21) Appl. No.: 09/898,714

(22) Filed: Jul. 3, 2001

(65) Prior Publication Data

US 2003/0009709 A1 Jan. 9, 2003

(51) Int. Cl.[7] .............................................. G06F 11/00
(52) U.S. Cl. ....................................... 714/37; 714/38
(58) Field of Search ..................... 714/37, 38; 719/312, 719/328

(56) References Cited

U.S. PATENT DOCUMENTS

| | | | | |
|---|---|---|---|---|
| 5,437,031 A | * | 7/1995 | Kitami | 719/312 |
| 5,701,408 A | * | 12/1997 | Cornell et al. | 714/38 |
| 5,708,774 A | * | 1/1998 | Boden | 714/38 |
| 5,771,383 A | * | 6/1998 | Magee et al. | 719/312 |
| 5,842,015 A | * | 11/1998 | Cunniff et al. | 718/104 |
| 5,991,820 A | * | 11/1999 | Dean | 719/312 |
| 6,108,782 A | * | 8/2000 | Fletcher et al. | 713/153 |
| 6,219,803 B1 | * | 4/2001 | Casella et al. | 714/38 |
| 6,457,142 B1 | * | 9/2002 | Klemm et al. | 714/38 |
| 6,523,137 B1 | * | 2/2003 | Stone | 714/38 |
| 6,604,209 B1 | * | 8/2003 | Grucci et al. | 714/38 |
| 6,654,911 B1 | * | 11/2003 | Miles | 714/38 |
| 2002/0133807 A1 | * | 9/2002 | Sluiman | 717/124 |
| 2002/0144006 A1 | * | 10/2002 | Cranston et al. | 709/312 |

OTHER PUBLICATIONS www.whatis.com."Application Program Interface".Feb. 16, 2004.*
www.wikipedia.com."Applciation Programming Interface".Apr. 2, 2004.*

* cited by examiner

*Primary Examiner*—Robert Beausoliel
*Assistant Examiner*—Yolanda L Wilson
(74) *Attorney, Agent, or Firm*—James M. Kasischke; Michael F. Oglo; Jean-Paul A. Nasser

(57) ABSTRACT

A method and system are provided by the present invention for testing performance validity and accuracy of functional elements of a computer application. A stand-alone test tool provides an environment in which the operation of the functional element can be monitored along with a plurality of interfaces between the functional element and the computer application. The test tool permits creation of a test data file which can be viewed and edited as desired outside of the test tool environment, and permits creation of a test case generation file with the user assisted by prompts as to interface task options. In a preferred embodiment a test cooperates with an interface protocol of a type involving a memory shared by multiple functional elements and employing a mode of notifying an addressed functional element that data is ready and of specifying the location of the data in the shared memory.

13 Claims, 2 Drawing Sheets

FUNCTIONAL ELEMENT TEST TOOL AND METHOD

STATEMENT OF THE GOVERNMENT INTEREST

The invention described herein may be manufactured and used by or for the Government of the United States of America for Governmental purposes without the payment of any royalties thereon or therefore.

CROSS-REFERENCE TO RELATED PATENT APPLICATIONS

Not applicable.

BACKGROUND OF THE INVENTION (1) Field of the Invention

The present invention relates generally to software testing and, more specifically, to a software test tool operable for providing an independent test environment for testing computer program system functional elements which may have multiple Application Data Exchange (ADE) interfaces.

(2) Description of the Prior Art

Large scale hardware and software systems and application may typically include many different functional elements or modules. In many cases, the various functional elements or modules are developed concurrently. As used herein, a functional element is a software module which performs a unique software task and which may have multiple interfaces with other functional elements and/or with an application comprised of numerous functional elements and/or with an overall system comprised of a plurality of applications. In a preferred embodiment of the present invention, the functional element performs one or more tasks which utilize an inter-task interface or module-to-module communication protocol or mechanism. Each functional element may have multiple interfaces. The interface sets forth constraints on formats, timing, and/or other factors required by an interaction of functional elements that perform different tasks within a computer system.

Once the system is assembled, various problems may occur that cannot be easily traced to a particular functional element or module. In many cases, the problems relate to errors that occur at the functional element or module interfaces. As an example, one module or functional element might test and analyze different underwater acoustic propagation signal propagation loss models. If the overall system response is not as expected, it may be difficult to determine whether the particular functional element for analyzing signal propagation loss is operating correctly or whether the fault lies elsewhere. Moreover, it may typically be difficult to monitor software interface operation of any particular functional element with respect to other functional elements and the overall system.

Where systems involve complex meshings of inter-process communications, a known technique for implementing the communication of task messages has been to use a shared memory for passing data between tasks. However, with this technique the problem of determining the fault which produces a given error is even greater.

Consequently, there remains a long felt but unsolved need for improved testing of functional elements to ensure that accurate processing occurs within each functional element and that communications between the functional elements are consistent with the interface protocols. Those skilled in the art will appreciate the present invention that addresses the above and other problems.

SUMMARY OF THE INVENTION

Accordingly, it is an object of the present invention to provide an improved system and method for testing functional elements of a computer software system.

Another object is to provide a system and method as aforesaid which provides a controlled test environment that can facilitate off-line quantitative analysis of the test results and collected data.

A further object is to provide a system and method as aforesaid which is a stand alone functional test tool that is much easier and faster to operate than a debugger or hand inspection of the application output results.

A still further object is to provide a system and method as aforesaid which enables software to reduce the overall number of defects that occur during the development phase.

A yet further object is to provide a system and method as aforesaid which is of special utility in application systems in which inter-process communication is implemented by techniques of using a shared memory scheme in order to pass data between tasks.

These and other objects, features, and advantages of the present invention will become apparent from the drawings, the descriptions given herein, and the appended claims. However, it will be understood that above listed objects and advantages of the invention are intended only as an aid in understanding aspects of the invention, are not intended to limit the invention in any way, and do not form a comprehensive list of objects, features, and advantages.

In accordance with the present invention, a method is disclosed for a stand-alone testing environment for a functional element of an application. The application may be a subpart of an overall system. The functional element may have a plurality of interfaces with the application and/or overall system. The method may comprise one or more steps such as, for instance, providing a computerized dialog to permit a user to create an input data file for the functional element, prompting a user for functional element interface tasks that have been previously developed utilizing the stand-alone testing environment. Alternatively, the dialog permits a user to start the functional interface tasks and a user supplied application system task. The plurality of interfaces are monitored.

Other steps may include storing a unique interface file for the functional element interface tasks and/or displaying a status window while running the functional interface tasks. In a preferred embodiment, the step of creating a test case generation file provides the user with task creation options related to the functional interface tasks. Other steps may include compiling the test case generation file to create a test case executable file for producing the functional interface tasks and/or storing the input data file in a user defined file such that the user defined file may be viewed and edited outside of the stand alone testing environment.

An embodiment of the present invention provides a method for testing a functional element of a computer system with a stand-alone functional element test tool wherein the functional element has at least one interface for communicating with other functional elements of the computer system using an interface protocol. In this embodiment, the method comprises one or more steps such as, for instance, creating an input data file for the functional element by prompting a user for data format and content, storing the input data file, creating a test generation file by providing the user with a plurality of task creation options such that the selected task creation options are input into the test generation file, compiling the test generation file to produce a test case executable file in a predetermined inter-process communication protocol based on the selected task creation options, initiating a test utilizing the test case executable file and the input data file for testing the functional element and the interface(s) by monitoring a status of the test, and storing test result data related to the test.

The step of creating a test generation file may further comprise selecting test initiation features and/or providing at least one user defined button wherein the user defined button is user operable for the step of initiating the test. The method may further comprise playing back the test result data and/or providing a file viewer for the input data. Thus, the method permits comparing the test result data with expected results from the functional element utilizing the input data file.

Thus, the present invention also provides a system operative for testing performance validity and accuracy of a first computer program functional element which may comprise one or more elements such as, for instance, a test case data file producing subsystem for facilitating the production by a user of at least one file of test case data. The test case data producing subsystem can then be used for identification of an input data structure in order to prompt a user for input values of the test case data. Preferably, the test case data producing subsystem is operative to store one or more files of test case data. Other elements may include a test case generation file producing subsystem for facilitating the production by a user of a test case generation file. The test case generation file producing subsystem provides a plurality of user options to facilitate the user in testing operation of the first computer program functional element and at least one communication interface. Moreover, the system may comprise a test case execution subsystem to operate the first functional element based on the selected user options and the test case data. The test case execution subsystem preferably provides a monitor for operation of the first functional element. Preferably the test case execution subsystem is operable for executing operation of a compiled executable file produced from the test case generation file. The test case execution subsystem may preferably be operable to effect operation of a second functional element simultaneously with operation of the first functional element such that the test case execution subsystem is operable to monitor the interface between the first function element and the second functional element. The test case execution producing subsystem is also preferably operative to tag an output of the first functional element with an indication of the task status. The test case generation file producing subsystem is also preferably operative to facilitate the user selecting a predetermined test initiation event to start flow of the test case data into the first functional element.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout several views of the drawings and wherein.

DESCRIPTION OF THE PREFERRED EMBODIMENTS

Figure 1:
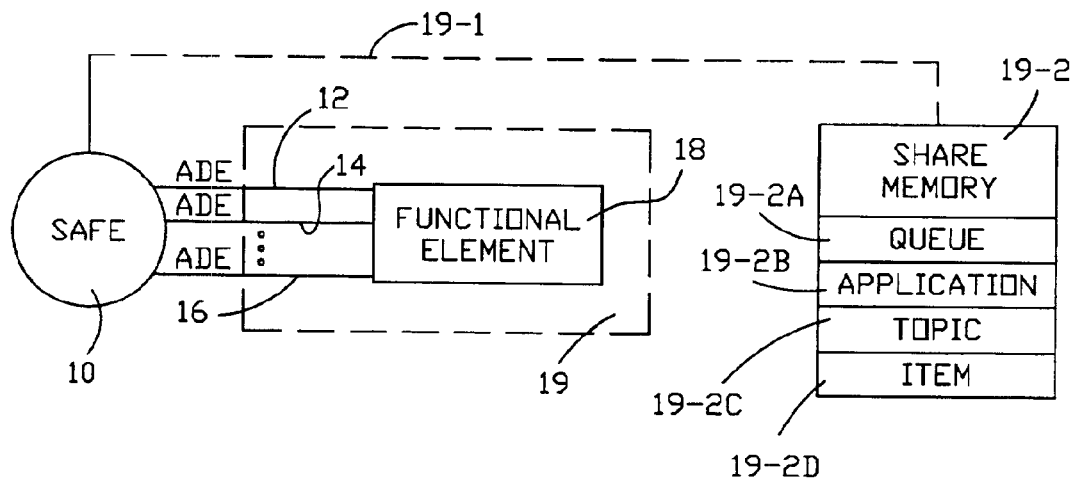
FIG. 1 is a schematic which indicates the general functioning of a stand-alone test tool in accord with the present invention.

Referring to FIG. 1, in accord with the present invention, a stand-alone functional element (SAFE) test tool 10 has been developed to provide an independent test environment for one or more functional elements 18, which are desired to be the object of testing, within a given application or system. In a preferred embodiment, the SAFE test tool can be utilized to test any test object software which utilizes an inter-module communication mechanism or interface protocol.

An illustrative embodiment of the inter-process communication protocol is the Application Data Exchange (ADE) protocol, which has been custom developed for the Navy for use in connection with software application programs. Illustrative of one such Navy application program is a Sensor Performance Prediction Functional Segment (SPPFS) large-scale software module. SPPFS has multiple interfaces with software programs of an integrated system of ASW equipment digital processors. Briefly, SPPFS performs casting and analysis of different acoustic signal propagation loss models used in ASW combat control. More particularly, it functions in connection with sonar-based antisubmarine warfare equipment known as system AN/SQQ-89(V) 15. However, both the SPPFS and the AN/SQQ-89(V) 15 are referred to for purposes of illustrating an environment, in which the present invention is utilized, and in and of themselves form no part of the invention.

ADE uses queues to communicate between application tasks. The concept of queue within ADE can be viewed as a mechanism for inter-process signaling. Each queue consists of one or more messages. Messages in turn contain information. An example of a queue with an implementation in the environment of ASW systems is the queue which is used by a propagation loss analysis function task element of a sonar signal analysis computer program to send equipment settings to the program's interface function task elements. This provides communication between the two tasks.

ADE uses a shared memory scheme in order to pass data between tasks. ADE manages the shared memory. Therefore when employed with SPPFS this functionality is invisible to the implementation of the SPPFS program task. However, the memory requirements of the implementation must be known and allocated via ADE functions (e.g., AdeAlloc). Message passing with ADE can be viewed as the notification by an ADE protocol message to a task that information (sometimes in this specification and its appended claims simply referred to as "data") is ready and that the data is located at a specific shared memory location.

ADE uses a hierarchical structure for storing information within the ADE database. There are four levels within the hierarchy, "Queue", "Application", "Topic", and "Item", where Queue is the most general and Item is the most specific. A Queue represents a highest level within the hierarchy. Within the SPPFS application program implementation, the Queue is typically the interface with the high level task. The Application is the second level and is associated with a queue. The functionality of an Application is typically more specific than that of a queue. However, within the SPPFS application the two often encompass the same functionality. The third level is a Topic which is associated with an Application. Again, the Topic is more specific than the queue. Finally the fourth level is the Item which is based on a Topic.

The SAFE test tool provides an excellent test bed for testing functional element changes as well as software drops because the user has the capability of generating, collecting, and responding to all interfaces of the specified system functional element. Although the SAFE test tool prompts the user for input to perform testing, it is assumed that the user understands the test object functional element operation within the overall system as well as the inter-module communication or interface protocol, e.g., the ADE protocol.

Referring again to FIG. 1, there is schematically shown SAFE test tool 10 interconnected with any number of interfaces, as indicated by 12, 14, and 16, of test object functional element 18 to provide an independent test environment. Each of interfaces 12, 14, and 16 may have several modes of operation which may be tested in accord with the present invention. SAFE test tool 10 provides a stand-alone test environment that may be utilized to simulate the application or overall system 19 with respect to test object functional element 18 and monitor any number of interfaces for proper operation, such as element interfaces 12, 14, and 16. The SAFE test tool 10 and the application or system 19 each communicate via a suitable linking arrangement, such as computer bus 19-1, with the above-discussed shared memory 19-2, that is involved in the shared memory scheme to pass data between tasks. Also per this earlier discussion, shared memory 19-2 has four levels of hierarchical structure: Queue 19-2A, Application 19-2B, Topic 19-2C, and Item 19-2D.

Figure 2:
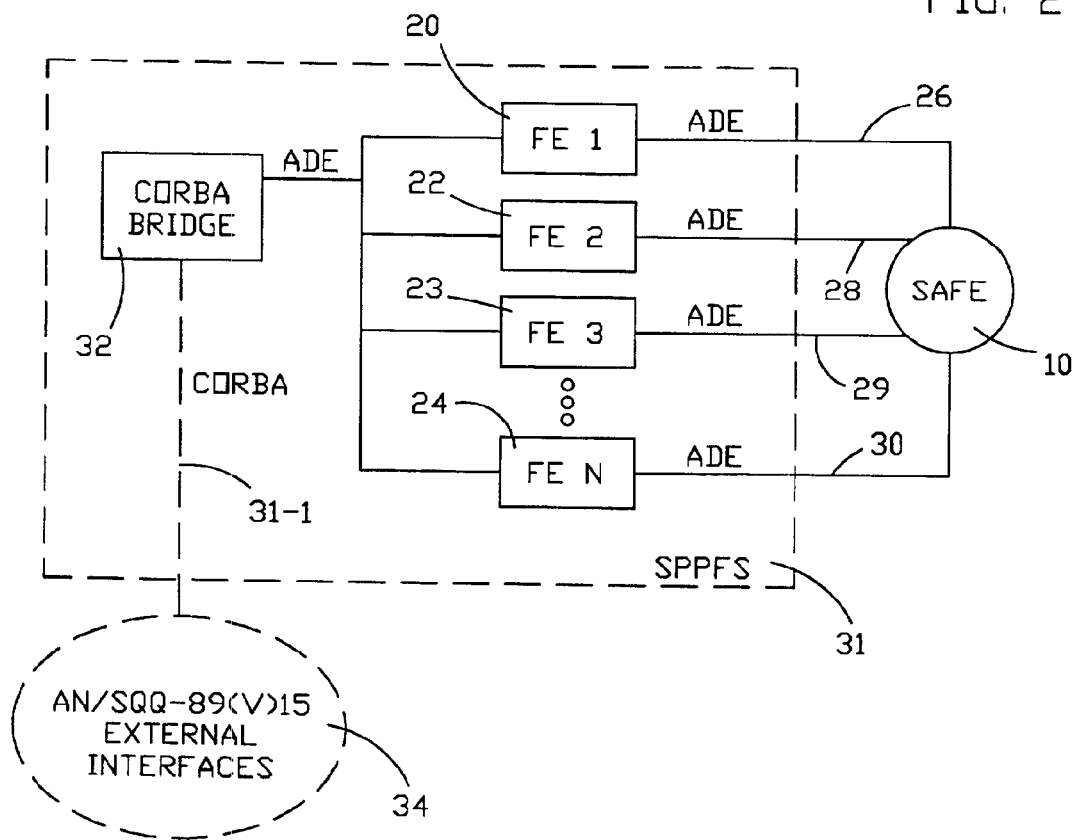
FIG. 2 is a schematic of an embodiment of a stand-alone test tool as the tool may be configured to cooperate with a given computer application system.

SAFE test tool 10 can also be utilized in other configurations. For instance, in FIG. 2, SAFE test tool 10 may be connected to one or more test object functional elements, such as functional elements 1, functional element 2, functional element 3, and functional element N, designated as 20, 22, 23, and 24, respectively, wherein communication paths 26, 28, 29, and 30, may comprise one or more ADE interfaces. Each ADE interface may have several modes of operation. In this embodiment, the test object functional elements may be part of or form a software application program such as, for example, one of the functional elements of the above described Sensor Performance Prediction Functional Segment (SPPFS) 31. In turn, SPPFS is part of an overall large-scale integrated system, such as the above referred to AN/SQQ-89(V)15 combat control system (not shown). The functional elements of SPPFS interface with various application programs of the large scale integrated system through multiple interfaces, with interface tasks constituting inter-process communications. There may be other elements such as a CORBA (common object request broker architecture) link 31-1 and a CORBA software bridge 32 which may be utilized with many functional elements utilizing, preferably, ADE interfaces. In another arrangement, AN/SQQ-89(V)15 External Interfaces 34 as indicated in dashed lines, may operate through link 31-1 and CORBA bridge 32 for testing one or more functional elements 20-24 and the various associated interfaces.

Figure 3:
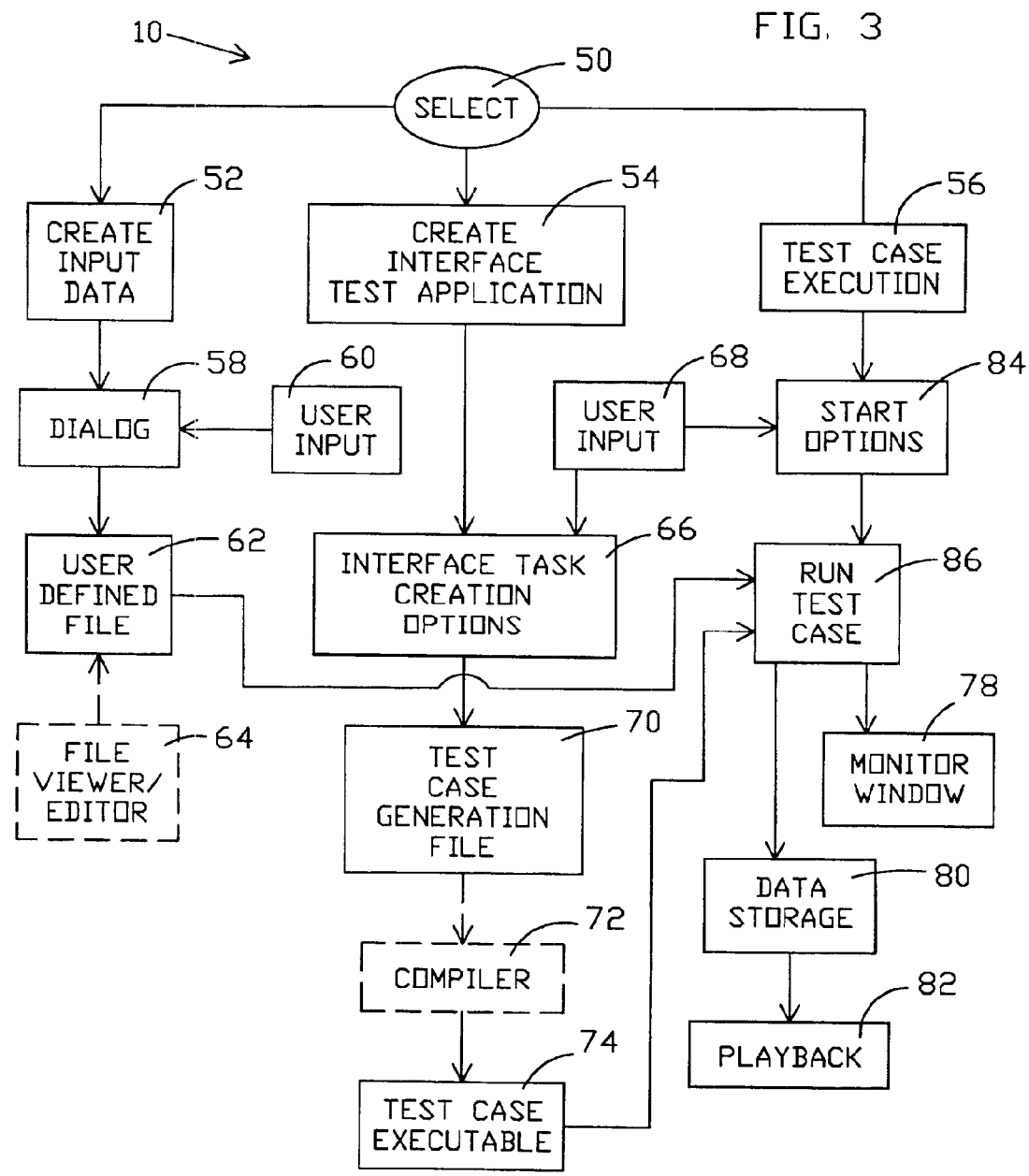
FIG. 3 is a block diagram indicating a flow and structure of a stand-alone test tool in accord with the present invention.

FIG. 3 provides an overview of the details of operation of SAFE test tool 10. In order to effectively interface with a test object functional element, i.e., the functional element involved in the run test case step 86 of a test. SAFE test tool 10 preferably operates in several selectable modes of operation or, in other words, is comprised of several selectable subsystems, as indicated at select subsystem 50. These subsystems of SAFE test tool 10 permit the user to create input data 52, create an interface test 54, application, and to run the tests 56.

Input file creator mode or subsystem 52 of SAFE test tool 10 provides a mechanism that allows a user to create one or more input data files that can eventually be accessed during test run time. During input file creation, SAFE test tool 10 provides a dialog with the user as indicated at 58 and 60. SAFE test tool 10 allows the user to identify the structure of the input data and then uses this structure to prompt the user as to possible input values 60 in conjunction with user dialog 58. This is accomplished by prompting the user for data format and content. The format may be manually entered or the format may be automatically determined. For instance, utilizing a drop-down form or other selection means, the user may identify the data structure to be utilized. Once the data format is identified, the data format is then utilized by SAFE test tool 10 to prompt the user to enter input values. When completed, the data is stored in a user-defined data input file 62. User-defined data input file 62 can now be used as an input file for future test cases. Preferably, the format of user-defined data input file 62 is such that the file contents may be viewed and modified outside of the environment of SAFE test tool 10 for ease of use. For instance, the file may be readable utilizing file editor 64 which may be a text file editor or any other suitable editor which preferably does not require the use of SAFE test tool 10.

Create interface test case mode or subsystem 54 of SAFE 10 provides a mechanism that allows the user to create a test case generation file. In one illustrative embodiment, the test generation file is recorded in the form of a high-level interface language, custom developed for ADE. The development of such a custom language is within the routine skill of programmers who develop special purpose compilers. More generally, the high-level interface language can be a development for any other interface protocol where such other interface protocol is involved. In this embodiment, it is assumed that the user is knowledgeable of the functional element interface task to be tested. The file generation is accomplished by providing the user with interface task creation options 66 and user input 68 and may include options such as Create Queue, Edit Queue, Begin Enumeration, and the like.

This description now proceeds to details of various preferred functional element task creation options. Create Queue allows SAFE test tool 10 to be able to create a Queue component of an ADE message which represents a function or functions to be performed for a test case. This component comprises the information (herein and the appended claims sometimes simply referred to as "data") stored in the Queue level of the ADE hierarchical shared memory. For each Queue message component, SAFE test tool 10 allows the creation of a user-defined Queue message component processing procedure or the use of a default Queue message component processing procedure. SAFE test tool 10 preferably has an edit queue option whereby SAFE test tool 10 allows editing of each queue. However, in a one preferred embodiment, once the Queue is created, SAFE test tool 10 is not able to delete the Queue message component. Another option is the Process Queue Messages option whereby SAFE test tool 10 preferably is able to add messages that will be automatically handled within the test case. For this purpose, SAFE test tool 10 writes data to an output file specified by the user. SAFE test tool 10 allows for the processing of multiple message contents in the same Queue message component. SAFE test tool 10 does not allow the addition of messages until the Queue message component for the test case has been created. The option is also provided for creating an Application component of an ADE message comprising data stored in the Application level of the shared memory, whereby SAFE test tool 10 preferably permits creation of multiple Application message components for each test queue. SAFE test tool 10 permits Application message component creation only after a Queue message component has been successfully created. An Edit Application option permits SAFE test tool 10 to modify each Application message component. A Create Topic message component option permits SAFE tool 10 to similarly create multiple Topic message components for each test application. Topic message components are capable of being created only after an Application message component has been successfully created. Edit Topic permits modification of each Topic message component. Create/Edit Item allows SAFE test tool 10 to be able to create and/or edit multiple Items message components. Note that Items message components are created only after a Topic message component has been successfully created. Enumerate on Application, Topic, or Queue, allows SAFE test tool 10 to be able to begin an enumeration on an application, topic, or item that has been defined in the task to be tested. SAFE test tool 10 automatically saves the server, Queue message component, and Topic message component identifiers upon successful enumeration. In addition, SAFE test tool 10 preferably provides the capability of allocating memory, requesting data, or requesting notice when the enumeration is satisfied. An Allocate/Free Memory option permits SAFE test tool 10 to be able to allocate and free memory and associate each memory block action with a given action (e.g., enumeration). A Send/Receive Data option permits SAFE test tool 10 to send and receive data to the task being tested. An Initiate Input Data option preferably permits SAFE test tool 10 to provide the capability of initiating input data by allowing the user to create, for instance, buttons or other indicators. Upon selection of the button, SAFE test tool 10 would then initiate data to the interface and functional element being tested. The input data will be accessed from a user defined input data file. The option to Insert Header Files permits SAFE test tool 10 to provide the user with the ability to insert header files into the software as needed. This can preferably be performed automatically or manually.

The selected options are input into a generation file that is used to create the functional element test case. One of the options, as discussed above, permits the user to accept/initiate data from/to the function element for the interface (preferably ADE) task being tested. Data may preferably be initiated automatically upon the occurrence of some event (e.g., receipt of a message) or manually via a user-defined button as discussed above. Upon completion of the test case generation process, test case generation file 70 is available. In a preferred embodiment, test case generation file 70 is compiled outside of SAFE test tool 10 utilizing, for instance, by a compiler 72 which compiles the various options selected to create test case executable 74.

Test case execution 56 of SAFE test tool 10 provides a mechanism to run multiple test case executables when testing a functional element application task as indicated at 84 and 86. In a preferred embodiment, this testing employs a predetermined interface protocol for inter-process communications, e.g., the ADE protocol. Test case executable files 74 are therefore the compiled executable version of the test case generation file created within the test case creation 54 mode. For each test case, SAFE test tool 10 preferably provides a monitoring window, as indicated at 78, that displays the current status of the given task. During test case generation stage 54, preferably print statements (for instance print statements) are automatically inserted that generate or print the status in monitoring window 78. In addition, the user define options (e.g., data initiation buttons) are displayed as dictated by each test case. The run test case step 86 is then performed under initiation by a start options function 84, using as inputs the user defined file 62 and test case executable 74. Upon completion of the task execution, the results are output to the test case and may be stored in data storage 80 for future analysis or playback such as indicated at 82. SAFE test tool 10 is operable to maintain a unique interface file for each functional element task as prescribed by the user.

Reference is again made to FIG. 3, for an example of use of SAFE test tool 10 in connection with the SPPFS software application program (see reference character 31, FIG. 2) and the operation of SPFFS in examining and analyzing different acoustic signal propagation loss models. Further, in this example, it is assumed that SAFE test tool 10 employs the ADE interface protocol for inter-process communications. Both the interface requirements and the specific input data requirements are well defined within the SPPFS application. Varying input data can be supplied and outputs can be collected to data files for off-line quantitative analysis utilizing playback 82, e.g., pointwise comparison with simulated/expected results. In addition, comparison of the different acoustic signal propagation models with different environments can be facilitated via SAFE test tool 10. When using SAFE test tool 10 in this way, the user would be prompted for the command line that initiates the selected SPPFS functional element to be the object of testing by SAFE test tool 10. In addition, the user would be prompted for the interface tasks as developed with interface task creation options 66. These tasks would be initiated via SAFE test tool 10 with test case executable 74. Upon successful initiation at 84, the user would have the ability to initiate inputs to the functional element to be tested. The responses from the test object functional element being tested during run test case step 86 would be maintained via SAFE test tool 10 for later comparison or output validation.

In accordance with the present invention, any application that utilizes a particular inter-module communication mechanism or interface such as the ADE protocol, or other interface protocols, will be significantly enhanced by the use an embodiment of SAFE test tool 10. SAFE test tool 10 facilitates functional level testing and evaluation of the application system (in the example, SPPFS) functional elements independently of the remainder of the system. In addition, SAFE test tool 10 provides a controlled test environment that can facilitate off-line quantitative analysis of the test results and collected data. Finally, SAFE test tool 10 provides a good environment for verifying software changes and status at a functional element level. This mechanism is therefore a valuable tool in the validation of software performance and processing accuracy. Quality software can be developed in less time and with fewer overall defects due to use of SAFE test tool 10 during the development phase. This affords significant cost savings both during the initial development phase as well as overall life cycle maintenance.

It will be appreciated by those skilled in the art that the invention can be implemented using a suitable programmed general purpose computer or special purpose hardware, with program routines or logical circuit sets performing as processors. Such routines or logical circuit sets may also be referred to as processors or the like.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method providing a stand-alone testing environment for a test object functional element of a computer system, said test object functional element having a plurality of interfaces for coupling with other elements of said computer system, said interfaces being of a type which provide communication between functional elements and which employ a predetermined interface protocol for inter-processing communication whose mode of operation involves a shared memory such that information communicated through said interfaces is passed between said functional elements by a process of notifying the addressed functional element that information is ready and providing the addressed functional element with its location in said shared memory, wherein said predetermined interface protocol is further of a type in which the location of information is distributed among a set of at least two hierarchical levels of a database formed in association with said shared memory, said hierarchical levels being organized by degree of generality of functional interface task information to be stored therein, said method comprising:

providing a computerized dialog to enable a user to create an input data file for said test object functional element in a form for subsequently being stored in an identifiable location in said shared memory;

prompting a user for at least one functional element interface task which has been previously developed utilizing said stand alone testing environment and which is of form compliant with said predetermined interface protocol and which is stored with its identifiable location in said shared memory;

starting said at least one functional element interface task utilizing said computer dialog created input data file;

monitoring said plurality of interfaces; and creating a test case generation file by providing the user with a corresponding set of task creation options related to said at least one functional element interface task individually operative with a degree of generality of functional task information that is to be stored in a corresponding individual level of said set of at least two hierarchical levels of said database.

2. The method of claim 1 further comprising storing a unique interface file corresponding to each functional element interface task selected by a user in response to said prompting.

3. The method of claim 2 further comprising storing said user created input data file in a user defined functional element interface task file such that said user created file may be viewed and edited outside of said stand alone testing environment.

4. A method for testing a test object functional element of a computer system with a stand-alone functional element test tool, said test object functional element having at least one interface for communicating with other functional elements of said computer system, said at least one interface having a predetermined interface protocol for inter-processing communication, wherein said predetermined interface protocol for inter-processing communication employs a mode of operation involving a memory shared among said test object and said other functional elements and in which information to be communicated through the interface is passed between functional elements by a process of notifying an addressed functional element that data is ready and providing the addressed functional element with a corresponding location in said shared memory, said interface protocol further being of a type in which a location of information is distributed among a set of at least two hierarchical levels of a database formed in association with said shared memory, said hierarchical levels being organized by degree of generality of functional interface task information, said method comprising:

creating an input data file for said test object functional element by promting a user for data format and content compatible with said predetermined interface protocol;

storing said input data file;

creating a test generation file by providing said user with a plurality of task creation options whereby selected task creation options are input into said test generation file which is written in a predetermined high level interface programmers' language adapted for compilation into computer code executable statements compatible with said predetermined protocol;

said step of providing the user with a plurality of task options including providing at least one corresponding set of options individually operative with a corresponding individual level of said set of at least two hierarchical levels of said database;

compiling said test generation file and said input data file to produce a test case executable file in a preferred programming language based on said selected task creation options;

initiating a test utilizing said test case executable file and said input data file for testing said test object functional element and said at least one interface by monitoring a status of said test; and storing test result data related to said test.

5. The method of claim 4 wherein said step of creating a test generation file further comprises selecting test initiation features.

6. The method of claim 4 further comprising displaying said input data to a user on a file viewer.

7. The method of claim 4 further comprising comparing said test result data with expected results from said test object functional element utilizing said input data file.

8. A system operative for testing performance validity and accuracy of a test object functional element, said test object functional element forming a portion of a computer system, said test object functional element having a plurality of communication interfaces with said test object functional element constrained to be operatively responsive to a predetermined interface communication protocol, said system comprising:

a test case data file producing subsystem for facilitating the production by a user of at least one file of test case data, said test case data producing subsystem being operative for identification of an input data structure and to utilize said input data structure to prompt a user for input values of said test case data, said test case data producing subsystem being operative to store said at least one file of test case data;

a test case generation file producing subsystem for facilitating the production by said user of a test case generation file, said test case generation file producing subsystem providing a plurality of user interface task options to provide the user with a choice among them in developing a test case generation file of a selected at least one interface task of said plurality of interface tasks, said selected at least one interface task being for communication to said test object functional element through a first predetermined at least one communication interface;

a test case execution subsystem to effect operation of said test object functional element based on said user selected at least one interface task and said at least one file of test case data, whereby said test case execution subsystem enables said user to test said test object functional element for validity and accuracy of its operation by monitoring a second predetermined at least one of the remaining communication of interfaces of said plurality of communication interfaces;

said interface communication protocol being a protocol inter-process communication of an application interface task from said test object functional element to at least one other functional element which also forms a portion of said computer system;

said plurality of interfaces including a subsystem for implementing said inter-process communication interface protocol comprising a memory operatively connected to said test object functional element and to said at least one other functional element by an arrangement whereby said functional elements share said memory;

said subsystem for implementing the inter-process communication interface protocol employing a mode of operation in which data to be communicated through an interface is passed between functional elements by a process of notifying the functional element to which an application interface task is be communicated that data is ready and providing the addressed functional element with the location of the data in said shared memory;

said shared memory being adapted to form a database having a set of at least two hierarchical database levels organized by degree of generality of interface task information; and said plurality of user interface task options provided by said test case generation file producing subsystem including providing at least one corresponding set of options individually operative solely with a corresponding level of said set of at least two hierarchical levels of said database.

9. The system of claim 8 wherein:

said input data structure is utilized to prompt a user for test case data being in a form cooperatively associated with said predetermined interface communication protocol to constrain said at least one test case data file to be compatible with said predetermined interface protocol;

said plurality of user interface task options provided by said test case generation file producing subsystem being in form cooperatively associated with said pre determined interface communication protocol to constrain said selected at least one interface task to be written in a predetermined high level interface programmers' language adapted for compilation into computer code executable statements compatible with said predetermined interface protocol; and said operation of said test object functional element effected by said test case execution subsystem comprising said operation of said test object functional element using a file of compiled executable statements based upon said test case data and said test case generation file.

10. The system of claim 8 wherein:

said input data structure is utilized to prompt a user for test case data being in a form cooperatively associated with said predetermined interface communication protocol to constrain said at least one test data file to be compatible with said predetermined interface protocol;

said plurality of user interface task options provided by said test case generation file producing subsystem being in form cooperatively associated with said predetermined interface communication protocol to constrain said selected at least one interface task to be written in a predetermined high level interface programmers' language adapted fox compilation into computer code executable statements compatible with said predetermined interface protocol; and said operation of said test object functional element effected by said test case execution subsystem comprising said operation of said test object functional element using a file of compiled executable statements based upon said test case data and said test case generation file.

11. The system of claim 8 wherein said test case execution subsystem is operable to effect operation of another test object functional element simultaneously with operation of said test object functional element.

12. The system of claim 8 wherein said test case execution subsystem is operable to monitor said at least one interface between said test object function element and said another test object functional element.

13. The system of claim 8 wherein said test case generation file producing subsystem is operative to provide the user a choice among a plurality test initiative events to cause the test to be performed upon a selected test initiation event to start flow of said test case data into said first functional element.

* * * * *